US008718656B2

(12) United States Patent
Chen et al.

(10) Patent No.: US 8,718,656 B2
(45) Date of Patent: May 6, 2014

(54) METHOD AND SYSTEM FOR EVALUATING A WIRELESS SERVICE NETWORK

(75) Inventors: Wei-Peng Chen, Fremont, CA (US);
Teng-Sheng Moh, Sunnyvale, CA (US);
Masato Okuda, Saitama (JP)

(73) Assignee: Fujitsu Limited, Kawasaki-shi (JP)

( * ) Notice: Subject to any disclaimer, the term of this patent is extended or adjusted under 35 U.S.C. 154(b) by 140 days.

(21) Appl. No.: 13/076,005

(22) Filed: Mar. 30, 2011

(65) Prior Publication Data

US 2012/0252466 A1 Oct. 4, 2012

(51) Int. Cl.
*H04W 40/00* (2009.01)

(52) U.S. Cl.
USPC ........... 455/446; 455/423; 455/447; 455/449; 455/562.1; 455/450; 379/114.01

(58) Field of Classification Search
CPC ..................................................... H04W 16/00
USPC .............. 455/423, 446, 449, 447, 562.1, 450; 379/114.01
See application file for complete search history.

(56) References Cited

U.S. PATENT DOCUMENTS

| | | | |
|---|---|---|---|
| 5,796,634 A | 8/1998 | Craport et al. | |
| 5,970,406 A | 10/1999 | Komara | 455/422 |
| 5,970,410 A | 10/1999 | Carney et al. | 455/446 |
| 6,690,662 B1 | 2/2004 | Komara et al. | 370/342 |
| 6,985,839 B1 | 1/2006 | Motamedi et al. | |
| 7,020,461 B2 | 3/2006 | Okanoue et al. | |
| 7,068,995 B1 | 6/2006 | Geddes et al. | |
| 7,099,669 B2 | 8/2006 | Sheffield | |
| 7,206,294 B2 | 4/2007 | Garahi et al. | 370/315 |
| 7,236,767 B1 | 6/2007 | Cankaya et al. | |
| 7,301,926 B1 | 11/2007 | Dietrich et al. | |
| 7,826,847 B1 | 11/2010 | Roskowski et al. | |
| 7,908,166 B2 | 3/2011 | Keil et al. | |
| 7,991,821 B2 | 8/2011 | Kan et al. | |
| 8,144,725 B2 | 3/2012 | Bienas et al. | |
| 8,320,878 B2 | 11/2012 | Vakil et al. | |

(Continued)

FOREIGN PATENT DOCUMENTS

| | | | | |
|---|---|---|---|---|
| EP | 1 168 867 A2 | 1/2002 | | |
| EP | 2 182 753 A1 | 5/2010 | ............ | H04W 24/02 |
| WO | WO 2005/120101 A1 | 12/2005 | | |

OTHER PUBLICATIONS

Chen et al., Method and System for Planning, Designing, and Evaluating Wireless Networks, U.S. Appl. No. 13/076,033, filed Mar. 30, 2011.

(Continued)

*Primary Examiner* — Amancio Gonzalez
(74) *Attorney, Agent, or Firm* — Baker Botts L.L.P.

(57) ABSTRACT

A method for evaluating a wireless service network includes receiving information indicative of a wireless coverage area associated with each of a plurality of base stations within a geographic area. The method also includes determining a threshold performance requirement within the geographic area. The method additionally includes simulating a deployment of at least one femto base station within the geographic area. The method further includes determining at least a first performance parameter based on the simulated deployment of the at least one femto base station within the geographic area. The method further includes generating a deployment recommendation based on at least the first performance parameter and the threshold performance requirement. The deployment recommendation may indicate whether to deploy the at least one femto base station within the geographic area.

18 Claims, 4 Drawing Sheets

(56) References Cited

U.S. PATENT DOCUMENTS

| | | | |
|---|---|---|---|
| 2002/0065721 A1 | 5/2002 | Lema et al. | |
| 2002/0099682 A1 | 7/2002 | Stanton et al. | |
| 2003/0096621 A1 | 5/2003 | Jana et al. | |
| 2006/0040641 A1 | 2/2006 | Dawson et al. | |
| 2009/0043666 A1 | 2/2009 | Malik et al. | |
| 2009/0291690 A1* | 11/2009 | Guvenc et al. | 455/444 |
| 2010/0022263 A1* | 1/2010 | Stamoulis et al. | 455/501 |
| 2010/0048217 A1 | 2/2010 | Deshpande et al. | 455/446 |
| 2010/0120447 A1 | 5/2010 | Anderson et al. | |
| 2010/0157823 A1 | 6/2010 | Li et al. | |
| 2010/0255848 A1 | 10/2010 | Abraham et al. | 455/446 |
| 2011/0069687 A1 | 3/2011 | Rezvani et al. | |
| 2011/0116452 A1 | 5/2011 | Welch et al. | |
| 2011/0119740 A1 | 5/2011 | Grayson et al. | 726/5 |
| 2012/0170466 A1* | 7/2012 | Lee et al. | 370/252 |

OTHER PUBLICATIONS

Chen et al., Method and System for Promoting Femtocell Services, U.S. Appl. No. 13/075,979, filed Mar. 30, 2011.

A. Valcarce, et al., Applying FDTD to the Coverage Prediction of WiMAX Femtocells, EURASIP Journal on Wireless Comm. and Networking, vol. 2009, Article ID 308606, Jul. 28, 2008.

Rep. ITU-R M.2135, Guidelines for Evaluation of Radio Interface Technologies for IMT-Advance, 2008.

Z. Yun, et al., A Ray-Tracing Method Based on the Triangular Grid Approach and Application to Propagation Prediction in Urban Environments, 0018-926X © 2002 IEEE.

USPTO; Office Action for U.S. Appl. No. 13/075,979 in the name of Wei-Peng Chen; 16 pages, Jun. 5, 2012.

USPTO; Office Action for U.S. Appl. No. 13/076,033 in the name of Wei-Peng Chen; 18 pages, Jun. 8, 2012.

European Patent Office; Extended European Search Report for Application No. 12157137.6-2412; 4 pages, May 22, 2012.

USPTO, Final Office Action for Wei-Peng Chen et al., U.S. Appl. No. 13/075,979, 22 pages, Jul. 3, 2013.

European Patent Office, Communication, Reference No. P118480EP00/OXT, Application No./Patent No. 12161426.7-1857 / 2506623, 6 pages, Oct. 4, 2013.

European Patent Office, European Search Report, Reference No. P118482EP00/FWW, Application No./Patent No. 12157541.9-1857 / 2506650, 5 pages, Oct. 4, 2013.

Chen et al., U.S. Appl. No. 13/075,979, Non-final Office Action issued by the U.S. Patent and Trademark Office, Mar. 7, 2013.

United States Office Action; U.S. Appl. No. 13/075,979; pp. 30, Mar. 7, 2013.

USPTO Final Office Action for Wei-Peng Chen et al., U.S. Appl. No. 13/076,033, 18 pages, Sep. 20, 2012.

USPTO Final Office Action for Wei-Peng Chen et al., U.S. Appl. No. 13/075,979, 21 pages, Oct. 19, 2012.

USPTO Advisory Action for Wei-Peng Chen et al., U.S. Appl. No. 13/076,033, 3 pages, Nov. 26, 2012.

USPTO Advisory Action for Wei-Peng Chen et al., U.S. Appl. No. 13/075,979, 4 pages, Nov. 26, 2012.

* cited by examiner

METHOD AND SYSTEM FOR EVALUATING A WIRELESS SERVICE NETWORK

TECHNICAL FIELD

The present disclosure relates generally to methods and systems for evaluating a wireless service network.

BACKGROUND

Various wireless technologies (e.g., 3G, 4G, 3GPP Long Term Evolution (LTE), LTE-Advanced (LTE-A), WiMAX, etc.) allow for the use of small, user installed, base stations, generally referred to herein as femto base stations (fBSs) (e.g., femtocells in WiMAX or Home node-B in 3GPP). The fBS is provided to the user by a wireless service provider. The user or a wireless service provider's technician installs the fBS in the user's home or office, generally referred to herein as a home or home location, to increase the signal quality and strength of the local wireless coverage. The fBS's backhaul connection to the wireless service provider's network (WSPN) is provided via the user's home network access (e.g., DSL). The fBS operates in a similar wireless fashion (e.g., uses the same licensed frequency band) to the wireless service provider's other base stations (e.g., macro base stations (MBSs) and/or relay stations (RSs)). The fBS may allow for the handover from the MBS to the fBS to be done without the user noticing (e.g., similar to the handover from one MBS to another).

In essence, an endpoint may view a fBS as another base station. Thus, any endpoint using the same wireless service may be able to establish a connection through the fBS. However, owners of the fBS may not want to make their fBSs available to the public, thus the owner may configure the fBS to only allow access from members of a closed subscription group (CSG) specified by the owner.

SUMMARY

The teachings of the present disclosure relate to methods and systems for evaluating a wireless service network. For example, a method for evaluating a wireless service network may include receiving information indicative of a wireless coverage area associated with each of a plurality of base stations within a geographic area. The method may also include determining a threshold performance requirement within the geographic area. The method may additionally include simulating a deployment of at least one femto base station within the geographic area. The method may further include determining at least a first performance parameter based on the simulated deployment of the at least one femto base station within the geographic area. The method may further include generating a deployment recommendation based on at least the first performance parameter and the threshold performance requirement. The deployment recommendation may indicate whether to deploy the at least one femto base station within the geographic area.

Technical advantages of particular embodiments include the ability to evaluate wireless networks providing femtocell services and fBSs. Another advantage of particular embodiments is that a wireless service provider may be able to determine whether or not to deploy femtocell service within a geographic area. A further advantage of particular embodiments is that a wireless service provider may also be able to determine a price of the femtocell service within the geographic area. A further advantage of particular embodiments is that a wireless service provider may be able to determine a spectrum utilization strategy for fBSs within a geographic area. Other technical advantages will be readily apparent to one of ordinary skill in the art from the following figures, descriptions, and claims. Moreover, while specific advantages have been enumerated above, various embodiments may include all, some, or none of the enumerated advantages.

BRIEF DESCRIPTION OF THE FIGURES

For a more complete understanding of particular embodiments and their advantages, reference is now made to the following description, taken in conjunction with the accompanying drawings, in which.

DETAILED DESCRIPTION

Figure 1:
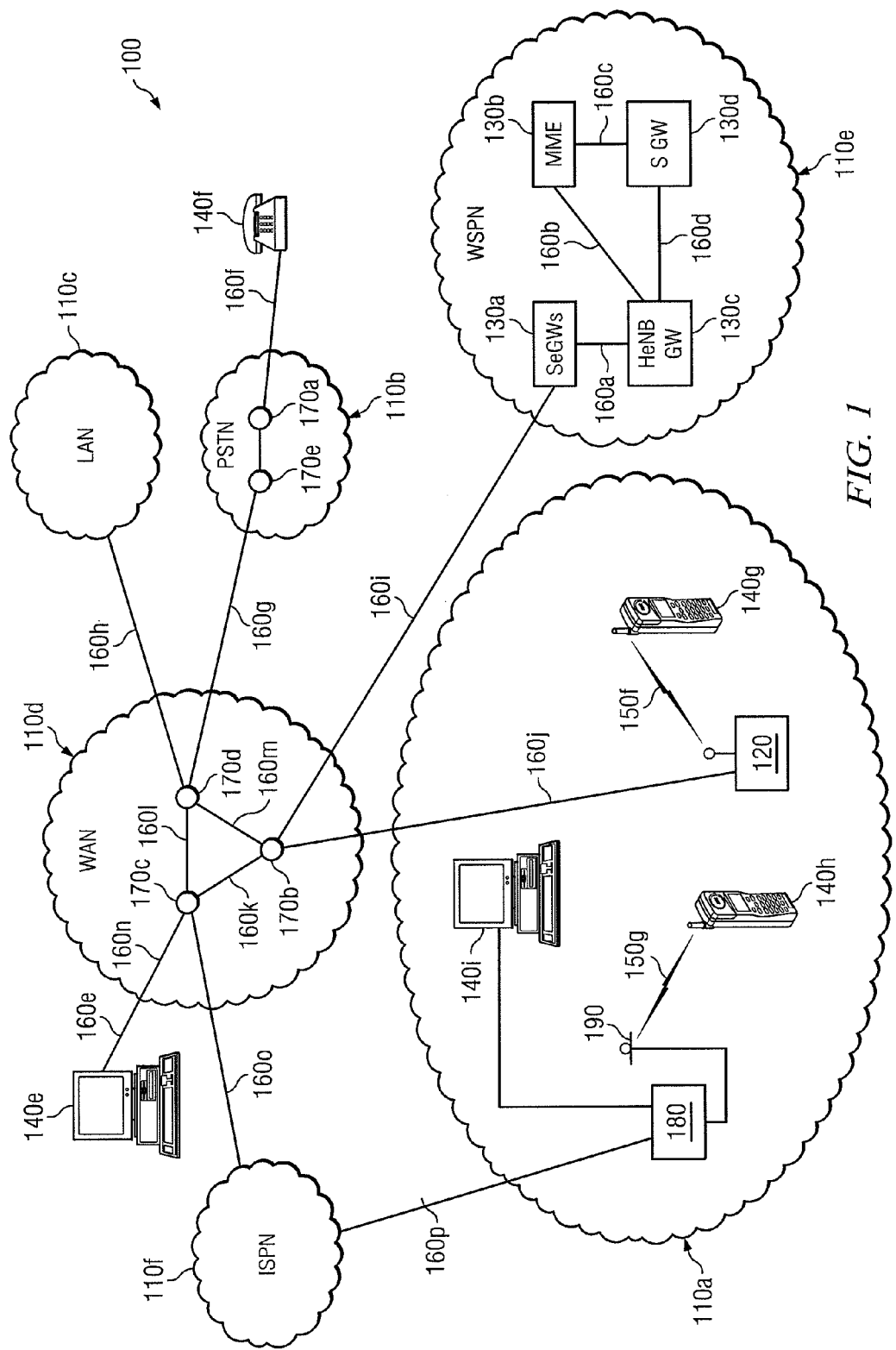
FIG. 1 illustrates a communication system comprising various communication networks, in accordance with a particular embodiment.

FIG. 1 illustrates a communication system comprising various communication networks, in accordance with a particular embodiment. Communication system 100 may be comprised of multiple networks 110. Each network 110 may be any of a variety of communication networks designed to facilitate one or more different services either independently or in conjunction with other networks. For example, networks 110 may facilitate internet access, wireless access (e.g., via LTE or WiMAX wireless service), online gaming, data downloading, file sharing, peer-to-peer file sharing (P2P), voice over internet protocol (VoIP) calls, video over IP calls, or any other type of functionality typically provided by a network. Networks 110 may provide their respective services using any of a variety of protocols for either wired or wireless communication. For example, network 110a may comprise an 802.16 wireless network (e.g., 802.16j), popularly known as WiMAX, which may include, among other components, macro base stations (MBSs), such as base station 120, and femto base stations (fBSs), such as fBS 190.

For simplicity and ease of discussion the remainder of this description may use a simplified nomenclature for the various entities, components, and networks discussed herein. "Home location" may refer to a place at which a user has home network access to an external network, such as the Internet. A home location is not limited to only a user's residence—it may include, for example, a user's office. "Home network access" may refer to any of a variety of techniques and/or technologies used to access one or more external networks, such as the internet, from the user's home location. For example, home network access may comprise a cable modem, a DSL modem, an xDSL modem, etc. "Home network" may refer to a local area network (LAN) configured within a user's home location. The LAN may include both wired and wireless connections. The term "internet" is not intended to be limited to only the Internet but includes any type of network, including public and private networks. "Internet service provider" (ISP) may refer to an entity that provides a user with his home network access. "Wireless service" may refer to any of a variety of techniques and technologies (e.g., WiMAX or LTE) used by a wireless service provider to provide endpoints with wireless connections over a large geographic area. "Wireless service provider" (WSP) may refer to the entity that provides the wireless service. While this nomenclature is used for simplicity, it does not represent the entire scope of all possible embodiments and/or scenarios. For example, an ISP may also be the WSP. As another example, the ISP may not be directly providing the user with internet access (e.g., the ISP may provide a building with internet access, the building may then provide the fBS user with internet access).

The embodiment depicted in FIG. 1 includes fBS 190. fBS 190 may, in essence, be a small base station purchased (or leased) by the user from his WSP. Once installed, fBS 190 may provide a geographically small coverage area that may be used to enhance the signal coverage within the user's home location. In some embodiments, fBSs 190 may use the same wireless service as the surrounding base stations 120. For example, in particular embodiments, fBSs 190 may use the same licensed spectrum (e.g., the spectrum licensed by the user's WSP) as the WSP's other local base stations 120 (e.g., MBSs, pico base stations (pBSs) (not depicted), and/or RSs (not depicted)). Depending on the scenario, the user may share his fBS's coverage with other, unknown users (e.g., the fBS is a public fBS), he may limit it to known/authorized users (e.g., the fBS is a private fBS), or some combination of the above. The known/authorized users may be referred as a CSG. Because each fBS user may be operating their own respective fBS, they may be more inclined to use their fBS in a CSG type configuration.

Although the example communication system 100 of FIG. 1 includes six different networks, networks 110a-110f, the term "network" should be interpreted as generally defining any network or combination of networks capable of transmitting signals, data, and/or messages, including signals, data or messages transmitted through WebPages, e-mail, text chat, voice over IP (VoIP), and instant messaging. Depending on the scope, size and/or configuration of the network, any one of networks 110a-110f may be implemented as a LAN, WAN, MAN, PSTN, WiMAX network, global distributed network such as the Internet, Intranet, Extranet, or any other form of wireless or wired networking.

Networks 110 may include any number and combination of wired links 160, wireless connections 150, nodes 170 and/or endpoints 140. For purposes of illustration, and only by way of example, network 110a is a MAN that may be implemented, at least in part, via WiMAX or LTE; network 110b is a PSTN; network 110c is a LAN; network 110d is a WAN, such as the internet; network 110e is a WSPN which may be operated by the WSP responsible for providing network 110a with wireless service (e.g., WiMAX); and network 110f is an internet service provider network (ISPN) which may be operated by the ISP responsible for providing its users with home network access, including internet access. Though not depicted in FIG. 1, ISPN network 110f may include servers, modems, gateways and any other components that may be needed to provide their respective service.

While networks 110 have been depicted as six separate networks, depending on the scenario any two, or more, of the networks may be a single network. For example, the WSP and the ISP may be the same business entity which may maintain the necessary components for both services on the same network thus merging ISPN network 110f and WSPN network 110e into a single network. Furthermore, the interconnections between networks 110 may vary from those depicted in FIG. 1. For example, if a user uses a Digital Subscriber Line (DSL) for his internet access, his network access device 180 may connect to PSTN 110b.

Generally, networks 110 provide for the communication of packets, cells, frames, or other portions of information (generally referred to as packets herein) between endpoints 140 and/or nodes 170. In particular embodiments, networks 110a, and 110c-110f may be IP networks. IP networks transmit data by placing the data in packets and sending each packet individually to the selected destination, along one or more communication paths. Network 110b may, for example, be a PSTN that may include switching stations, central offices, mobile telephone switching offices, pager switching offices, remote terminals, and other related telecommunications equipment that are located throughout the world. Network 110d may be coupled to network 110b through a gateway. Depending on the embodiment, the gateway may be a part of network 110b and/or 110d (e.g., nodes 170e and/or 170c may comprise a gateway). The gateway may allow PSTN 110b to be able to communicate with non-PSTN networks such as any one of networks 110a or 110c-110f.

Any of networks 110a or 110c-110f may be coupled to other IP networks including, but not limited to, the Internet. Because IP networks share a common method of transmitting data, signals may be transmitted between devices located on different, but interconnected, IP networks. In addition to being coupled to other IP networks, any of networks 110a or 110c-110f may also be coupled to non-IP networks through the use of interfaces or components such as gateways. Similarly, PSTN 110b may be able to connect to other networks, including IP networks via interfaces or gateways.

Networks 110 may be connected to each other and with other networks via a plurality of wired links 160, wireless connections 150, and nodes 170. Not only do wired links 160, wireless connections 150, and nodes 170 connect various networks but they also interconnect endpoints 140 with one another and with any other components coupled to or a part of any of networks 110. The interconnection of networks 110 may enable endpoints 140 to communicate data and control signaling between each other as well as allowing any intermediary components or devices to communicate data and control signals. Accordingly, users of endpoints 140 may be able to send and receive data and control signals between and among each network component coupled to one or more of networks 110.

In the depicted embodiment, wireless connections 150f and 150g may represent wireless links between base station 120 or fBS 190 and endpoints 140 using, for example, WiMAX. In other embodiments, wireless connections 150 may use other wireless technologies and/or protocols, such as LTE, or LTE-A. The extended range of a WiMAX, LTE, or LTE-A MBS, along with one or more relay stations, pBS, and/or fBSs may, in certain cases, allow network 110a to cover a larger geographic area associated with a MAN.

Nodes 170 may include any combination of network components, modems, session border controllers, gatekeepers, ISPN gateways, WSPN gateways, security gateways, operation administration maintenance and provisioning (OAM&P) servers, network access provider (NAP) servers, base stations, conference bridges, routers, hubs, switches, gateways, endpoints, or any other hardware, software, or embedded logic implementing any number of communication protocols that allow for the exchange of packets in communication system 100. For example, node 170e may comprise a gateway. As a gateway node 170e may allow network 110b, a PSTN network, to be able to transmit and receive communications from other non-PSTN networks, such as network 110*d*, an IP network. In some instances, as a gateway, node 170*e* may translate communications between the various protocols used by networks 110*b* and 110*d*.

In particular embodiments, network 110*e* may comprise various servers, gateways, switches, routers, and other nodes used in providing one or more wireless services. For example, WSPN 110*e* comprises mobility management entity (MME) 130*b*, security gateways 130*a*, serving gateway 130*d*, and home node gateway 130*c*. MME 130*b* may be responsible for storing, organizing, and/or maintaining bindings received from various endpoints. Security gateways 130*a* may comprise multiple, logically separate security gateways. While the gateways may be logically separated, they may physically be collocated or separated. Security gateways 130*a* may provide security to WSPN 110*e* for endpoints accessing WSPN 110*e* via the internet and/or for fBSs accessing WSPN 110*e*. In particular embodiments, this security may be provided by two logically separated security gateways. For example, one security gateway may be responsible for internet based connections while a second separate security gateway may be responsible for fBS based connections.

Home node gateway 130*c* may serve as a concentrator for the Control-Plane (e.g., the S1-MME interface). In some embodiments home node gateway 130*c* may terminate the user plane towards home node gateway 130*c* and towards serving gateway 130*d*. Home node gateway 130*c* may provide a relay function for relaying User Plane data between home node gateway 130*c* and serving gateway 130*d*. In some embodiments, home node gateway 130*c* may support NAS Node Selection Function (NNSF). While certain components have been described and depicted within WSPN 110*e*, a WSPN may include different, fewer, or additional components.

Network access devices 180 may provide home network access to fBS 190 through any combination of hardware, software embedded in a computer readable medium, and/or encoded logic incorporated in hardware or otherwise stored (e.g., firmware). In some embodiments, network access device 180 may be supplied by the user's ISP. For example, if the user's ISP is a cable company then the ISP may supply a cable modem as network access device 180. As another example, if the user's ISP is a phone company then the ISP may supply an xDSL modem as network access device 180. As may be apparent, network access device 180 may provide home network access to components other than fBSs 190. For example, the user may connect his personal computer to network access device 180 to access the internet.

Endpoints 140 and/or nodes 170 may provide data or network services to a user through any combination of hardware, software embedded in a computer readable medium, and/or encoded logic incorporated in hardware or otherwise stored (e.g., firmware). For example, any one of endpoints 140 may be a cell phone, an IP telephone, a computer, a video monitor, a camera, a personal data assistant or any other hardware, software, and/or encoded logic that supports the communication of packets (or frames) using one or more of networks 110. Endpoints 140 may also include unattended or automated systems, gateways, other intermediate components, or other devices that can send or receive data and/or signals.

Although FIG. 1 illustrates a particular number and configuration of endpoints, connections, links, and nodes, communication system 100 contemplates any number or arrangement of such components for communicating data. In addition, elements of communication system 100 may include components centrally located (local) with respect to one another or distributed throughout communication system 100.

Figure 2:
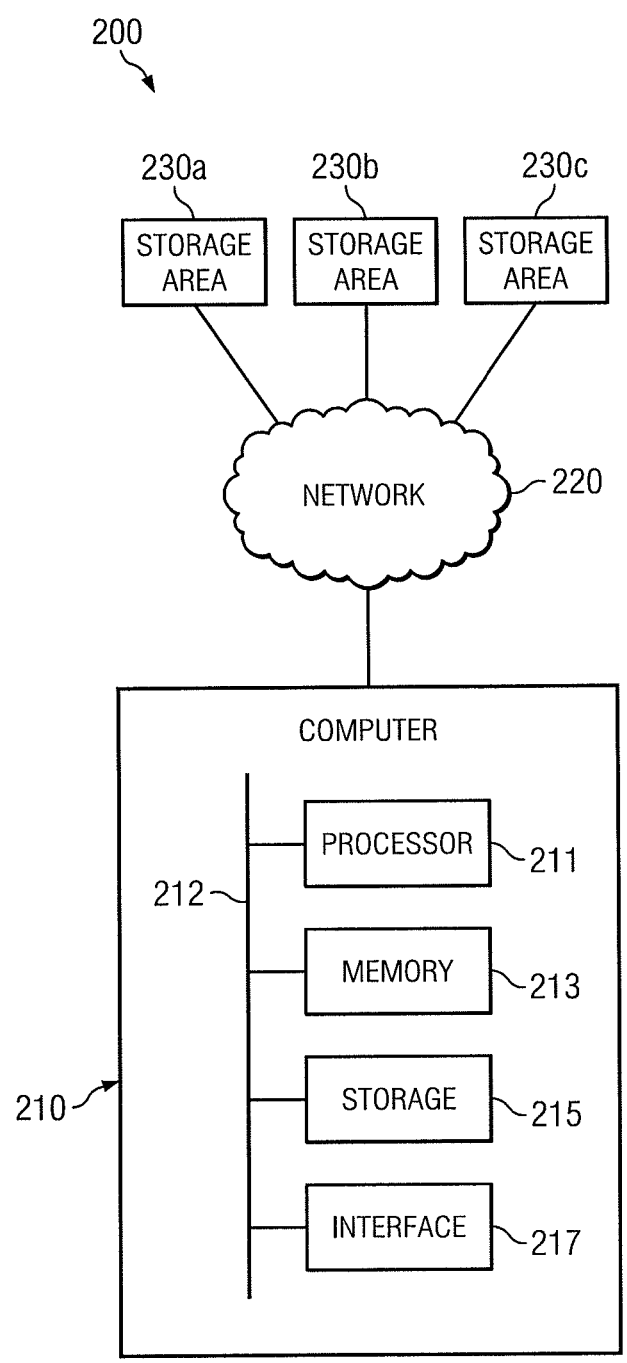
FIG. 2 illustrates a network comprising a more detailed view of a computer, in accordance with a particular embodiment.

FIG. 2 illustrates a network comprising a more detailed view of a computer, in accordance with a particular embodiment. The depicted network 200 is a simplified scenario comprising computer 210, network 220, and storage areas 230*a*-230*c*. Computer 210 may include one or more portions of one or more computer systems. In particular embodiments, one or more of these computer systems may perform one or more steps of one or more methods described or illustrated herein. In particular embodiments, one or more computer systems may provide functionality described or illustrated herein. In some embodiments, encoded software running on one or more computer systems may perform one or more steps of one or more methods described or illustrated herein or provide functionality described or illustrated herein.

The components of computer 210 may comprise any suitable physical form, configuration, number, type and/or layout. As an example, and not by way of limitation, computer 210 may comprise an embedded computer system, a system-on-chip (SOC), a single-board computer system (SBC) (such as, for example, a computer-on-module (COM) or a system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer 210 may include one or more computer systems; be unitary or distributed; span multiple locations; span multiple machines; or reside in a cloud, which may include one or more cloud components in one or more networks. In one embodiment, computer 210 may be a radio system level simulator or a commercial radio planning tool.

Where appropriate, computer 210 may perform without substantial spatial or temporal limitation one or more steps of one or more methods described or illustrated herein. As an example, and not by way of limitation, computer 210 may perform in real time or in batch mode one or more steps of one or more methods described or illustrated herein. One or more computers may perform at different times or at different locations one or more steps of one or more methods described or illustrated herein, where appropriate.

In the depicted embodiment, computer 210 may include processor 211, memory 213, storage 215, interface 217, and bus 212. These components may work together to plan, design, and evaluate wireless networks that may include fBSs, as is discussed below. Although a particular network is depicted as having a particular number of particular components in a particular arrangement, this disclosure contemplates any suitable network 200 having any suitable number of any suitable components in any suitable arrangement. For simplicity, only the components of computer 210 are depicted. Other devices in network 200 may have one or more of the components described below with respect to computer 210.

Processor 211 may be a microprocessor, controller, or any other suitable computing device, resource, or combination of hardware, software and/or encoded logic operable to provide, either alone or in conjunction with other components (e.g., memory 213), the ability to plan, design, and evaluate wireless networks that may include fBSs. Such functionality may include providing various features discussed herein. For example, processor 211 may identify one or more potential deployment customers to which to deploy a fBS. Additional examples and functionality provided, at least in part, by processor 211 will be discussed below.

In particular embodiments, processor 211 may include hardware for executing instructions, such as those making up a computer program. As an example, and not by way of limitation, to execute instructions, processor 211 may retrieve (or fetch) instructions from an internal register, an internal cache, memory 213, or storage 215; decode and execute them; and then write one or more results to an internal register, an internal cache, memory 213, or storage 215.

In particular embodiments, processor 211 may include one or more internal caches for data, instructions, or addresses. This disclosure contemplates processor 211 including any suitable number of any suitable internal caches, where appropriate. As an example and not by way of limitation, processor 211 may include one or more instruction caches, one or more data caches, and one or more translation lookaside buffers (TLBs). Instructions in the instruction caches may be copies of instructions in memory 213 or storage 215. The instruction caches may speed up retrieval of those instructions by processor 211. Data in the data caches may be copies of data in memory 213 or storage 215 for instructions executing at processor 211 to operate on; the results of previous instructions executed at processor 211 for access by subsequent instructions executing at processor 211, or for writing to memory 213, or storage 215; or other suitable data. The data caches may speed up read or write operations by processor 211. The TLBs may speed up virtual-address translations for processor 211. In particular embodiments, processor 211 may include one or more internal registers for data, instructions, or addresses. Depending on the embodiment, processor 211 may include any suitable number of any suitable internal registers, where appropriate. Where appropriate, processor 211 may include one or more arithmetic logic units (ALUs); be a multi-core processor; include one or more processors 211; or any other suitable processor.

Memory 213 may be any form of volatile or non-volatile memory including, without limitation, magnetic media, optical media, random access memory (RAM), read-only memory (ROM), flash memory, removable media, or any other suitable local or remote memory component or components. Memory 213 may store any suitable data or information utilized by computer 210, including software embedded in a computer readable medium, and/or encoded logic incorporated in hardware or otherwise stored (e.g., firmware). In particular embodiments, memory 213 may include main memory for storing instructions for processor 211 to execute or data for processor 211 to operate on. As an example and not by way of limitation, computer 210 may load instructions from storage 215 or another source (such as, for example, another computer system, storage areas 230, or a remote transceiver) to memory 213. Processor 211 may then load the instructions from memory 213 to an internal register or an internal cache. To execute the instructions, processor 211 may retrieve the instructions from the internal register or internal cache and decode them. During or after execution of the instructions, processor 211 may write one or more results (which may be intermediate or final results) to the internal register or internal cache. Processor 211 may then write one or more of those results to memory 213. In particular embodiments, processor 211 may execute only instructions in one or more internal registers or internal caches or in memory 213 (as opposed to storage 215 or elsewhere) and may operate only on data in one or more internal registers or internal caches or in memory 213 (as opposed to storage 215 or elsewhere). Bus 212 may include any combination of hardware, software embedded in a computer readable medium, and/or encoded logic incorporated in hardware or otherwise stored (e.g., firmware) to couple components of computer 210 to each other. As an example and not by way of limitation, bus 212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 212 may include any number, type, and/or configuration of buses 212, where appropriate. In particular embodiments, one or more buses 212 (which may each include an address bus and a data bus) may couple processor 211 to memory 213. Bus 212 may include one or more memory buses, as described below. In particular embodiments, one or more memory management units (MMUs) may reside between processor 211 and memory 213 and facilitate accesses to memory 213 requested by processor 211. In particular embodiments, memory 213 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 213 may include one or more memories 213, where appropriate.

In particular embodiments, storage 215 may include mass storage for data or instructions. As an example and not by way of limitation, storage 215 may include an HDD, a floppy disk drive, flash memory, an optical disc, a magneto-optical disc, magnetic tape, or a Universal Serial Bus (USB) drive or a combination of two or more of these. Storage 215 may include removable or non-removable (or fixed) media, where appropriate. Storage 215 may be internal or external to computer 210, where appropriate. In particular embodiments, storage 215 may be non-volatile, solid-state memory. In particular embodiments, storage 215 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 215 may take any suitable physical form and may comprise any suitable number or type of storage. Storage 215 may include one or more storage control units facilitating communication between processor 211 and storage 215, where appropriate.

In particular embodiments, interface 217 may include one or more interfaces for one or more I/O devices. One or more of these I/O devices may enable communication between a person and computer 210. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. Particular embodiments may include any suitable type and/or number of I/O devices and any suitable type and/or number of interfaces 117 for them. Where appropriate, interface 117 may include one or more device or encoded software drivers enabling processor 211 to drive one or more of these I/O devices. Interface 117 may include one or more interfaces 117, where appropriate.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

Particular embodiments may include one or more non-transitory computer-readable storage media implementing any suitable storage. In particular embodiments, a computer-readable storage medium implements one or more portions of processor 211 (such as, for example, one or more internal registers or caches), one or more portions of memory 213, one or more portions of storage 215, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Computer 210 is coupled to network 220. Network 220 may comprise hardware, software, encoded logic, or any combination thereof. The term "network" should be interpreted as generally defining any network or combination of networks capable of transmitting signals, data, and/or messages, including, but not limited to, signals, data or messages transmitted through WebPages, e-mail, text chat, voice over IP (VoIP), and instant messaging. Depending on the scope, size, and/or configuration, network 220 (or any of its constituent networks) may be implemented as a LAN, WAN, MAN, PSTN, globally distributed network such as the Internet, Intranet, Extranet, or any other form of wireless or wired networking. Generally, network 220 provides for the communication of packets, cells, frames, or other portions of information (generally referred to as packets herein) between the various components. More specifically, network 220 may couple the computer 210 to one or more storage areas 230 so that computer 210 may access any information stored in storage areas 230.

In particular embodiments, storage areas 230 may include mass storage for data or instructions. As an example and not by way of limitation, storage areas 230 may include an HDD, a floppy disk drive, flash memory, an optical disc, a magneto-optical disc, magnetic tape, or a Universal Serial Bus (USB) drive or a combination of two or more of these. Storage areas 230 may include removable or non-removable (or fixed) media, where appropriate. In particular embodiments, storage areas 230 may be non-volatile, solid-state memory. In particular embodiments, storage areas 230 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage areas 230 may take any suitable physical form and may comprise any suitable number or type of storage. In particular embodiments, storage areas 230 may refer to databases accessible by the computer 210. In particular embodiments, storage areas 230 may store any suitable data for planning, designing, and evaluating wireless networks that may include fBSs. For example, storage areas 230 may store demographic information associated with a geographic area (e.g., population density, income, subscription status, etc.), geographic information associated with a geographic area (city, county, state, buildings, etc.), topographic information associated with a geographic area (e.g., elevations, vegetation, etc.), current subscriber information for a service provided by the service provider, current licensed spectrum information for a wireless network, information regarding spectrum available for licensing, licensing cost information associated with the licensing available spectrum, deployment cost information associated with deploying fBSs within a geographic area (e.g., installation costs, site leasing costs, spectrum licensing costs, etc.), change in data throughput information associated with deploying the fBSs within the geographic area, information regarding expected fees to be charged for deploying fBSs within a geographic area (e.g., normal customer charges, promotional customer chargers, etc.), and/or any other suitable information used or created during the planning, designing, and evaluating of wireless networks that may include fBSs.

Thus far, several different embodiments and features have been presented. Particular embodiments may combine one or more of these features depending on operational needs and/or component limitations. This may allow for great adaptability of network 200 to the needs of various organizations and users. Some embodiments may include additional or different features. In particular embodiments, the functionality of computer 210 may be provided by additional or different devices.

According to particular embodiments, the teachings of the present disclosure relate to planning, designing, and evaluating wireless networks that may include fBSs. Traditionally, wireless service providers have been unable to effectively plan, design, or evaluate wireless networks providing femtocell services and fBSs. Specifically, various obstacles have rendered the planning, designing, and evaluating of wireless networks infeasible with regard to femtocell services and fBSs. For example, unlike traditional base stations (such as MBSs, pBSs, RSs, etc.) where the deployment of the base stations is controlled by the wireless service provider, the wireless service provider has little or no control over the deployment of fBSs. In particular, because fBSs are owned or leased by the individual customers, the wireless service provider will not know which home locations will have fBS deployed thereto. Moreover, the wireless service provider may have much less control over where the fBS may be located within a customer's home location. Therefore, it is not feasible to evaluate all the possible combinations of fBS locations because the number of potential fBS site locations is significantly greater than traditional base stations. As another example, the wireless coverage range for a fBS is significantly less than for traditional base stations. In particular, while the wireless coverage range of a MBS may be several square miles, the wireless coverage range for an fBS is limited to a relatively small area (e.g., encompassing a house). Thus, planning, designing, and evaluating networks that include fBSs was, traditionally, infeasible.

In one embodiment, the planning, designing, and evaluating of wireless networks may include a three stage process: (1) a "Pre-Planning" stage (FIG. 3) that may assist a service provider in making strategic decisions prior to launching femtocell service within a particular geographic area; (2) a "Promotion" stage (FIG. 4) that may assist the service provider in promoting the femtocell services to a specific group of customers whose subscription to the femtocell services may benefit the service provider; and (3) an "Operation" stage (FIG. 5) that may assist a service provider in determining installation configuration parameters for a quicker successful deployment of fBSs. In some embodiments, depending on the scenario, the Pre-Planning stage may occur during the deployment planning of a new wireless service, after a traditional wireless network (e.g., a wireless network comprising MBSs, pBSs, RSs, etc.) has been planned but not fully deployed, or after the traditional wireless network has been deployed within a geographic area. In certain embodiments, the Promotion stage may occur after the wireless service has been launched by the service provider. In a further embodiment, the Operation stage may occur after the wireless service has been launched by the service provider and/or any time a potential deployment customer is identified (e.g., a request for a fBS has been received from a potential deployment customer).

Each of FIGS. 3-5, discussed below, may refer to the deployment of fBSs. In one embodiment, the deployment of a fBS may comprise any suitable action for providing femtocell service to a customer. For example, the deployment of the fBS may comprise providing the fBS equipment to the customer, providing femtocell service to the fBS, configuring the fBS for operation, or any other suitable action associated with deploying a fBS.

Furthermore, each of FIGS. 3-5, discussed below, may refer to "potential deployment customers." In one embodiment, potential deployment customers may comprise any suitable person, establishment, corporation, or any other suitable entity to which a fBS may potentially be deployed. In a further embodiment, potential deployment customers may comprise existing customers of the wireless service provider who do not subscribe to femtocell service with the wireless service provider (e.g., they may subscribe to other wireless services provided by the wireless service provider), or people or entities that neither subscribe to wireless service with the wireless service provider nor femtocell service with the wireless service provider (e.g., non-customers).

Figure 3:
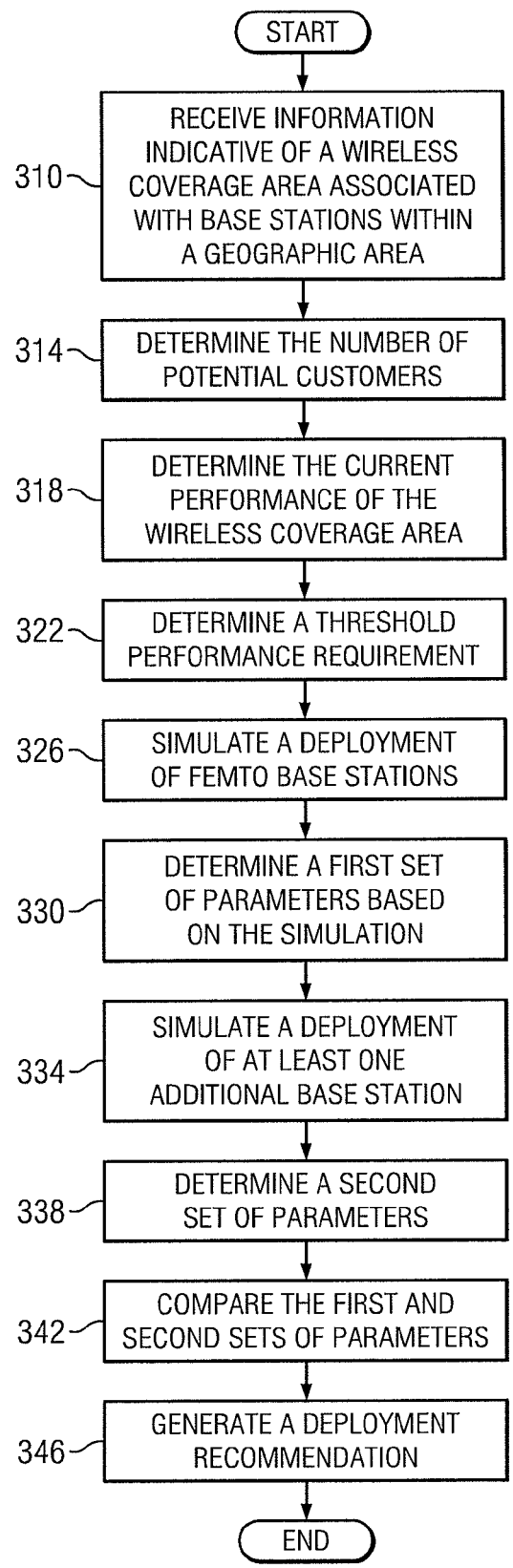
FIG. 3 illustrates a method for evaluating a wireless service network within a geographic area, in accordance with a particular embodiment.

FIG. 3 illustrates a method for evaluating a wireless service network within a geographic area, in accordance with a particular embodiment. In particular embodiments, this method may allow a wireless service provider to make strategic decisions about deploying fBSs within a geographic area. For example, based on the determinations performed in this method, a wireless service provider may be able to understand at a high level the performance of the wireless service network and how incorporating fBSs may affect that performance. In particular, the wireless service provider may be able to determine how the fBSs will affect wireless capacity, backhaul capacity, latency, the flow of traffic (such as traffic being redirected from MBSs to fBSs), and revenue. Accordingly, the wireless service provider may be able to determine whether or not to deploy femtocell service within a geographic area, and may also be able to determine a price of the femtocell service within the geographic area.

In one embodiment, the method of FIG. 3 may be performed by a computer, such as computer 210 of FIGURE 2. As such, the method of FIG. 3 may performed by a radio system level simulator or a commercial radio planning tool.

The method begins at step 310 where the computer receives information indicative of a wireless coverage area associated with base stations within a geographic area. The information may be associated with base stations that have already been deployed or that are planned to be deployed in the future. In those instances in which the wireless coverage area information is based on the planned deployment of base stations, the information may be based on simulations of the deployment of the base stations. In those instances in which the wireless coverage area information is based on the actual deployment of base stations, the information may be based on measurements made within the geographic area, simulations of the deployed base stations, or some combination of the two. In one embodiment, the wireless coverage associated with the base stations may comprise wireless coverage associated with any suitable type of base station. For example, the base stations may comprise MBSs, pBSs, RSs, or any other suitable base stations. The wireless coverage area information may be used, among other things, to determine the current capacity of the wireless network and/or to identify locations within the geographic area where the wireless coverage does not meet one or more performance thresholds. For example, the identified locations may be areas within the geographic area where the wireless signal strength is weak or where there is insufficient bandwidth available.

At step 314 the computer determines the number of potential customers within the geographic area. In one embodiment, the computer may determine the number of potential customers based on demographic information. For example, the computer may receive demographic information associated with the geographic area. Such demographic information may comprise current population levels, addresses associated with the population, expected population growth, information regarding current customers of the wireless service provider, age distribution, household income, education level, or any other suitable demographic information about the geographic information. Such demographic information may further include any information accessible from the U.S. Census Bureau.

Once the demographic information is received, the computer may identify a subset of the population within the geographic area. The subset may be identified based on the identified locations where the wireless signal is not performing as desired, an analysis of any suitable demographic factors, or a combination of the above. For example, the computer may identify the subset based on household income range, age range, education level range, etc. After the subset of the population is identified, the computer may then determine the number of potential customers by multiplying the subset of the population by a probability of subscription. The probability of subscription may be based on historical data provided by the wireless service provider based on, for example, prior deployments, deployments by other wireless service providers, other sources of historical adoption of wireless services, or some combination of the above. In some embodiments, the probability of subscription may be based on a function of the household income range, age range, education level, etc., of the population within the geographic area.

In some embodiments, the computer may determine the number of potential customers based on a previous list of customers, such as customers who had subscribed to previous generations of wireless services provided by the wireless service provider. As such, the number of potential customer may be determined using an existing customer database accessible by the wireless service provider.

In particular embodiments, potential deployment customers may be identified based on the number of potential customers. In some embodiments, the potential deployment customers may also be identified based on market share held by the wireless service provider within the geographic area. For example, the computer may multiply the total number of potential customers (e.g., people living within the geographic area) by the market share (e.g., the percentage of people within the geographic area who are already customers of the wireless service provider) in order to calculate a subset of the potential customers. In such an example, the market share may be determined by the computer, or may be input into the computer by a user. In certain embodiments, if the number of potential customers is calculated using demographic information, the computer may randomly select addresses from among all of the addresses within the geographic area. In another embodiment, if the number of potential customers is calculated using a previous list of customers, the computer may randomly select addresses from among the addresses on the list.

At step 318 the computer determines the current performance of the wireless coverage area. In one embodiment, the computer determines the current performance based on the information indicative of the wireless coverage area received by the computer in step 310. In one embodiment, the current performance of the wireless coverage area may refer to the coverage and throughput provided by the base stations within the geographic area. The current performance may also refer to the cost (e.g., maintenance, operation, etc.) of providing the wireless coverage. The current performance of the wireless system may be determined in any suitable manner using any suitable information.

At step 322 the computer determines a threshold performance requirement. The threshold performance requirement may comprise any suitable wireless performance requirement. For example, the threshold performance requirement may comprise the total wireless capacity required within the geographic area during peak usage times. As another example, the threshold performance requirement may comprise the total wireless capacity required within the geographic area during average usage times. In one embodiment, the threshold performance requirement may provide an indication of how much usage the wireless system network may be expected to receive. In certain embodiments, the threshold performance requirement may be based on a desired future performance requirement to reflect expected growth in the number of customers. The expected growth may be based on the number of potential customers and/or the probability of subscription discussed above. The threshold may be based on usage, capacity, cost, or any other metric identified by the wireless service provider.

The threshold performance requirement may be determined in any suitable way. In one embodiment, the threshold performance requirement may be determined based on an estimation of the wireless usage requirements of current and/or potential deployment customers. For example, when the wireless service provider is entering a new market, each of the potential deployment customers may be associated with wireless subscription plans for the wireless service. In such an example, this association may be made based on the probability of subscription discussed above. In another embodiment, this association may be made based on any other information derived during the above steps. In one embodiment, after the computer associates the potential deployment customers with wireless subscription plans for the wireless service, the computer may estimate the threshold performance requirement based on the potential deployment customers and their associated subscription plans. In a further embodiment, the estimation may be made based on any other suitable factors, such as typical wireless usage during peak hours.

At step 326 the computer simulates the deployment of fBSs within the geographic area. In one embodiment, the simulation may comprise a computer simulation of the wireless coverage resulting from the fBSs being deployed (e.g., installed and operating) within the geographic area. As such, the simulation may include the wireless coverage provided both by the existing base stations within the geographic area and also the added fBSs. In one embodiment, this combination of the existing base stations (MBSs, pBSs, RSs, etc.) and the fBSs may be referred to as a "heterogeneous environment."

In one embodiment, the simulation may include deploying the fBSs so that they operate in particular modes. For example, the simulation may include one or more of the fBSs operating in CSG, OSG, or HSG.

In one embodiment, the simulation may include deploying any suitable number of fBSs. For example, during the simulation, only a single fBSs may be deployed or multiple fBSs may be deployed. In a further embodiment, the number of fBSs deployed during the simulation may be based on a percentage of the potential deployment customers. For example, the number of fBSs may be ten percent of the number of potential deployment customers, twenty percent of the number of potential deployment customers, or any other suitable percentage.

In one embodiment, the simulation may include deploying the fBSs to particular locations within the geographic area. For example, the fBSs may be deployed to a particular address within the geographic area. As a further example, the fBSs may be deployed to any of the addresses of the potential deployment customers. In one embodiment, the selection of the addresses may be random. For example, the selection of the addresses may be based on the probability of subscription, discussed above. As another example, the selection of the addresses may be based on a uniform random distribution. In another embodiment, the selection of the addresses may be based on any suitable algorithm. In a further embodiment, the number of addresses that femto bases stations are deployed to may be based on a percentage of the addresses of the potential deployment customers.

At step 330 the computer determines a first set of parameters based on the simulated deployment of the fBSs. In certain embodiments, the first set of parameters may include a first performance parameter. A first performance parameter may include any indication of the wireless coverage that results from the simulation. For example, the first performance parameter may be based on the bandwidth, coverage area, signal quality, wireless capacity, backhaul capacity, any other parameter related to the wireless network, or some combination of the above. In some embodiments, the first set of parameters may further include a first cost parameter. A first cost parameter may include the capital expenditure (such as equipment costs for the fBSs, security gateways, femto cell gateways, etc.) and operation costs (such as costs for maintenance, technical support, customer support, providing another channel for the fBSs to operate on, providing additional bandwidth, etc.) associated with deploying the fBSs. As such, the first cost parameter may comprise the total costs associated with deploying the fBSs.

At step 334 the computer simulates a deployment of additional base stations within the geographic area. In one embodiment, the additional base stations may not include fBSs. For example, the additional base stations may only include base stations of the type that were already existing within the geographic area, such as MBSs, pBSs, RSs, etc. In particular embodiments, such a deployment may be simulated for comparison with the simulation of deployment of the fBSs. For example, this deployment may be simulated in order to determine whether adding additional MBSs, pBSs, RSs and/or any other suitable type of base station already existing in the geographic area may result in better performance than deploying fBS.

In one embodiment, the simulation of step 334 may comprise a computer simulation of the wireless coverage resulting from the additional base stations being deployed (e.g., installed and operating) within the geographic area. As such, the simulation may include the wireless coverage provided both by the existing base stations within the geographic area and also the added base stations. Furthermore, in one embodiment, the simulation performed by the computer at step 334 may not include any of the fBSs from steps 326 and 346. As such, the simulation may only include base stations of the same type as the base stations already existing within the geographic area. In one embodiment, this may be referred to as a "homogenous environment."

In one embodiment, the simulation at step 334 may include deploying any suitable number of additional base stations. For example, during the simulation, only a single additional base station may be deployed or multiple additional base stations may be deployed. In one embodiment, the number of additional base stations may be determined in any suitable way. In another embodiment, the simulation at step 334 may include deploying the additional base stations to particular locations within the geographic area. In one embodiment, the locations where additional base stations are deployed may be determined in any suitable manner.

At step 338 the computer determines a second set of parameters based on the simulated deployment of the additional base stations. In one embodiment, the second set of parameters may include a second performance parameter. A second performance parameter may include any indication of the wireless coverage that results from the simulation at step 334. For example, the second performance parameter may be based on the bandwidth, coverage area, signal quality, wireless capacity, backhaul capacity, any other parameter related to the wireless network, or some combination of the above. In one embodiment, the second set of parameters may include a second cost parameter. A second cost parameter may include the capital expenditure (such as equipment costs for the additional base stations, security gateways, etc.) and operation costs (such as costs for maintenance) associated with deploying the additional base stations. As such, the second cost parameter may comprise the total cost associated with deploying the additional base stations.

In particular embodiments, the information received by the computer and used in the simulations performed at steps 326 and 334 may comprise any combination of any number of different types of suitable information that may be related to, or may impact, the wireless network and/or any of its associated costs. For example, the information may include geographic or topographic data associated with the geographic area. This data may include city, county, and/or state borders, building sizes and locations, terrain, elevation, and land cover data received from a U.S. Geological Survey (USGS). This data may also include any information which may relate to the physical location of a base station or fBS and/or which may impact the range of its wireless signal.

The information may include infrastructure data associated with providing the coverage area. The infrastructure data may include any suitable data regarding antennas, cellular towers, base stations, cabling, switching or routing offices, site leasing (e.g., leased land or building space), or any other suitable infrastructure data. For example, this infrastructure data may include location data for any aspect of the infrastructure (such as the locations of any base stations, antennas, or cellular towers within the geographic area), performance data for any aspect of the infrastructure, cost (e.g., acquisition, rent, maintenance, upgrade etc.) data for any aspect of the infrastructure, or any other suitable infrastructure data. The infrastructure data may include any suitable infrastructure data stored and maintained by the wireless service provider, or by the Federal Communications Commission (FCC).

The information may also include spectrum information related to the availability of wireless spectrum (e.g., currently leased and/or available to be leased by the wireless service provider). The spectrum information may be related to available frequencies, bandwidth, costs associated with licensing available spectrum, any other feature or component related to available spectrum, or some combination of the above.

The information may also include capacity data. The capacity data may be associated with the cumulative capacity of the deployed or to be deployed base stations or fBSs, or the individual capacity of a single base station or fBS. In addition, the capacity may be associated with wireless capacity, wired capacity, backhaul capacity, switching capacity, processing capacity, or the capacity of any other component or service needed to provide wireless coverage.

The information may further include monetary information. The monetary information may include fees that are currently being charged to current customers or estimated fees that could be charged upon deploying fBSs or other base stations. The monetary information may include promotional pricing, promotional discounts or incentives. The monetary information may include costs associated with deploying base stations or fBSs. The costs may relate to initial deployment costs (e.g., purchasing new hardware, installing the hardware, configuring the hardware, acquiring site space, leasing spectrum, etc.) and recurring costs (e.g., rental fees for the site, spectrum license renewal, utilities, maintenance, etc.).

At step 342 the computer compares the first and second sets of parameters. The comparison may comprise one or more of the first and second performance parameters and the first and second cost parameters. The comparison may be used to help decide between deploying fBSs or additional base stations within the geographic area. In some embodiments, the first and/or second performance parameters may be compared to the threshold value to determine if either simulation resulted in sufficiently improved parameters (e.g., parameters that meet or exceed the threshold performance determined at step 322). In some embodiments, the computer may determine whether additional simulations are to be conducted. In certain scenarios, this determination may be made based on input from an operator of the computer. According to particular embodiments, a determination that additional simulations are to be conducted may allow the computer to simulate additional ways that the threshold performance requirement may be met.

At step 346 a deployment recommendation is generated. In one embodiment, the deployment recommendation may indicate whether fBSs should be deployed within the geographic area. For example, based on one or more of the simulations at steps 326 and 334, and the threshold performance requirement determined at step 322, the computer may determine that deploying the fBSs within the geographic area is desirable or undesirable. As a further example, based on one or more of the simulations at steps 326 and 334, and the threshold performance requirement determined at step 322, the computer may determine that deploying additional base stations within the geographic area is desirable or undesirable. In some embodiments, the computer may determine that it is desirable to deploy a combination of fBSs and base stations. In certain embodiments the computer may determine that it is not advantageous to deploy fBSs or base stations. This may occur, for example, when neither simulation generates performance parameters that exceed the threshold determined at step 322. In a further embodiment, the deployment recommendation may indicate the performance parameters and/or cost parameters that may be expected if the fBSs are either deployed or not deployed.

In one embodiment, the computer may generate the deployment recommendation based at least on the first performance parameter. For example, the computer may determine that it is desirable to deploy the fBSs within the geographic area when the first performance parameter meets the threshold performance requirement.

In a further embodiment, the computer may generate the deployment recommendation based on the comparison of the first performance parameter and the second performance parameter. For example, based on the comparison of the first and second performance parameters, the computer may determine that better performance results from a heterogeneous system (which includes fBSs) than a homogenous system (which does not include fBSs). As such, the computer may generate a deployment recommendation that indicates that fBSs should be deployed within the geographic area.

In another embodiment, the computer may generate the deployment recommendation based on the comparison of the first and second cost parameters. For example, based on the comparison of the first and second cost parameters, the computer may determine that lower costs result from a heterogeneous system (which includes fBSs) than a homogenous system (which does not include fBSs). As such, the computer may generate a deployment recommendation that indicates that fBSs should be deployed within the geographic area.

In a further embodiment, the computer may generate the deployment recommendation based on the comparison of the first and second performance parameters and the first and second cost parameters. For example, based on the comparison of the first and second performance parameters and the first and second cost parameters, the computer may determine that better performance and/or lower costs result from a heterogeneous system (which includes fBSs) than a homogenous system (which does not include fBSs). As such, the computer may generate a deployment recommendation that indicates that fBSs should be deployed within the geographic area.

In one embodiment, the generation of the deployment recommendation may further result in the computer making additional determinations. In particular, the computer may determine one or more deployment strategies for the fBSs (such as a spectrum utilization strategy). For example, the computer may determine whether the fBSs and the other base stations (MBSs, pBSs, RSs, etc.) should share wireless channels, or whether to dedicate wireless channels to the fBSs. As another example, the computer may determine one or more operational modes (CSG, OSG, HSG, etc.) for the fBSs. As a further example, the computer may determine the bandwidth of the fBS channels. In one embodiment, these determinations may be made based on the comparison of the first and second performance parameters and/or the first and second cost parameters.

In one embodiment, the step of generating the deployment recommendation may further include the computer generating a pricing strategy associated with deploying the fBSs within the geographic area. In particular, the pricing strategy may be generated based on information on capital expenditures and savings (such as for equipment, site leasing, security gateways, femto cell gateways, backhaul connections, etc.), operating costs and savings (such as for maintenance, technical support, customer support, spectrum, etc.), marketing input (such as how much a potential deployment customer may be willing to pay for the femtocell service), and/or any other suitable information. In one embodiment, the computer may generate the pricing strategy in any suitable way. For example, the pricing strategy may be based on the cost of equipment, cost of additional channels (such as when the fBSs received their own dedicated channel), and the cost of base station channel bandwidth. As another example, the pricing strategy may be based on the operation modes of the fBSs (CSG, OSG, HSG, etc.). In one embodiment, the computer may generate the pricing strategy so that the wireless service provider may determine a price that may attract the potential deployment customers to subscribe to the femtocell service. Depending on the embodiment, the price may be a nationwide price, a local price for the femtocell service, or some other price (e.g., a nationwide price with a local promotional discount that expires after a certain amount of time (e.g., 6 months)).

In another embodiment, the step of generating the deployment recommendation may further include the computer determining profit margins for the deployment of the fBSs. For example, the price that the wireless service provider may charge the customer for the wireless service using the fBSs may be compared with the costs to the wireless service provider for operating the fBSs (e.g., such as the costs of providing and maintaining the service) in order to determine a profit margin. Furthermore, the computer may determine how to adjust the pricing strategy and/or the performance of the wireless network in order to maximize the profit margin. Additionally, the computer may determine how to adjust the pricing strategy and/or the profit margin in order to increase the performance of the wireless service network.

While the embodiment depicted in FIG. 3 includes a certain number of steps, depicted in a certain order, it is to be understood that other embodiments may have more, fewer or different steps, and the steps may be rearranged. For example, in some embodiments, a computer may generate a deployment recommendation without simulating the deployment of additional base stations. As another example, in some embodiments, simulation steps 326 and/or 334 may be repeated multiple times in which the number and/or placement of the base stations and/or fBSs is changed each time. The repetition may be used to better identify a more optimal deployment.

Figure 4:
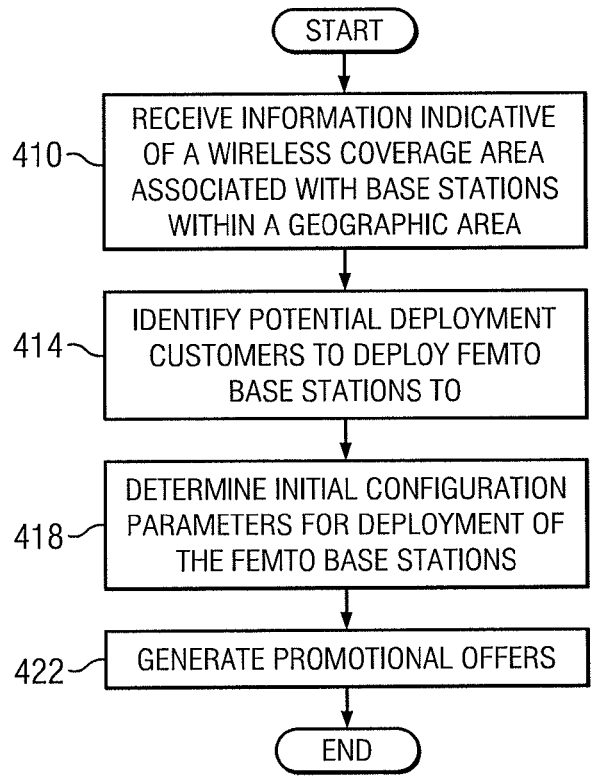
FIG. 4 illustrates a method for promoting femtocell services, in accordance with a particular embodiment.

FIG. 4 illustrates a method for promoting femtocell services, in accordance with a particular embodiment. In one embodiment, the method of FIG. 4 may provide a wireless service provider with the ability to identify locations and/or potential deployment customers where deploying fBSs may bring the most benefits to the wireless service provider's network. In another embodiment the method of FIG. 4 may provide the wireless service provider with the ability to promote femtocell services to potential deployment customers in such a way that the overall wireless system performance is enhanced, the individual service to customers is increased, and/or the wireless service provider's revenue may be increased. For example, by adding additional customers, the wireless service provider's revenue may increase. Furthermore, by adding additional fBSs to the network at locations where the fBSs can bring the most benefits to the wireless service network, traffic may be redirected from existing base stations to the fBSs. This may reduce the traffic load on the existing base stations in the wireless network, thereby allowing a higher quality of service to be provided to customers. Furthermore, by redirecting traffic from the existing base stations to fBSs, the wireless service provider may be able to reduce the expense of maintaining its backhaul connections for existing base stations. In some instances, a wireless service provider may provide discounted rates to customers using the fBSs to encourage their use.

In one embodiment, the method of FIG. 4 may be performed by a computer, such as computer 210 of FIG. 2. As such, the method of FIG. 4 may performed by a radio system level simulator or a commercial radio planning tool.

The method begins at step 410 where the computer receives information indicative of a wireless coverage area associated with base stations within a geographic area. In one embodiment, the information may be any suitable information indicative of the wireless coverage area. For example, the information may be similar to the information of step 310 of FIG. 3. As another example, the information may include any information received, used, or determined during the methods of FIG. 3 and/or FIG. 5. As a further example, the information may be a selection of the wireless coverage area within the geographic area and/or a selection of the geographic area.

At step 414 the computer identifies potential deployment customers to which to deploy fBSs. In particular embodiments, the computer may identify the potential deployment customers in any suitable manner. In one embodiment, the potential deployment customers may be identified by receiving an indication from the potential deployment customer. For example, the potential deployment customer may contact the wireless service provider in order to learn about femtocell service or to set up femtocell service. As another example, the computer may identify potential deployment customers by randomly selecting addresses from the subset of the potential customers. The addresses of the subset of the potential customers may be retrieved in any suitable way, such as through information from the U.S. Census Bureau, or through detailed maps available from, for example, online map resources. In one embodiment, the random selection of addresses may be based on the probability of subscription, discussed above. In another embodiment, the random selection of address may be based on a uniform random distribution of femtocell subscription. The random selection may be limited to particular locations (e.g., where there is a weak wireless signal) within the geographic area.

In one embodiment, the computer may identify the potential deployment customers based on wireless usage data. For example, the potential deployment customers may comprise existing customers having a high volume of wireless service usage in a location where a fBS may be deployed. In particular, the potential deployment customers may have a high volume (e.g., high traffic or long usage) of indoor usage of wireless services within the customers' houses, offices, or any other suitable locations where a fBS may be deployed. In one embodiment, by deploying fBSs to a location where the existing customers have a high volume of indoor wireless service usage, a significant portion of the customers' wireless usage may be redirected through the fBSs. This may reduce the traffic directed through the existing base stations, thereby increasing the performance of the wireless service. Furthermore, since a significant portion of the customers' wireless usage may now be redirected through the fBSs (which use the customers' network access for the respective fBS's backhaul connection, not the wireless service provider's network access), the wireless service provider may be able to offer discounted prices to the customer.

In one embodiment, any suitable method may be used to identify the potential deployment customers based on wireless usage data. For example, the computer may access and search one or more databases that include information regarding the wireless usage data of existing customers. In one embodiment, the method of FIG. 4 may further include the computer generating the information stored in these databases.

In another embodiment, the computer may identify the potential deployment customers based on wireless performance data. For example, the potential deployment customers may comprise existing customers that suffer frequent dropped wireless service while within a location where a fBS may be deployed. In particular, the potential deployment customers may suffer frequent dropped wireless service while within the customers' houses, offices, or any other suitable locations where a fBS may be deployed. In one embodiment, since the potential deployment customers may be suffering frequent dropped wireless service within the particular locations, the deployment of fBSs to these locations may improve wireless signal reception.

In one embodiment, any suitable method may be used to identify the potential deployment customers based on wireless performance data. For example, the computer may access and search one or more databases that include information regarding the wireless performance data of existing customers. In such an example, these databases may include information regarding measurements of the customers' wireless service, or may include a log of the number of times wireless service has been dropped for each of the customers. In one embodiment, the method of FIG. 4 may further include the computer generating the information stored in these databases.

In another embodiment, the potential deployment customers may be identified by identifying potential deployment locations within the geographic area. For example, the potential deployment customers may comprise existing customers that are associated with an address (e.g., the address is the address of their house, office, etc.) that falls within a location of the wireless coverage area where wireless service is unsatisfactory. In one embodiment, since the potential deployment customers may be located in an area where they may be prevented from receiving adequate wireless service, the deployment of fBSs to these locations may improve wireless signal reception.

In one embodiment, any suitable method may be used to identify these potential deployment customers. For example, the wireless coverage area within a geographic area may be evaluated in order to identify locations where the wireless coverage provides unsatisfactory wireless service. In particular, the wireless area may be evaluated to determine locations where there is a weak wireless signal, no wireless signal, and/or insufficient wireless bandwidth. In one embodiment, by identifying such locations, the computer may identify the potential deployment locations. Furthermore, once the potential deployment locations have been identified, in one embodiment, the computer may identify the potential deployment customers based on a comparison of the potential deployment locations with the location data associated with current customers within the geographic area. For example, the computer may compare the potential deployment locations (e.g., locations with a weak wireless signal, no wireless signal, and/or insufficient wireless bandwidth) with the addresses of customers. In such an example, if the addresses of customers fall within the potential deployment locations, the customers may be identified as potential deployment customers.

In one embodiment, in order to identify the potential deployment customers based on potential deployment locations, the computer may access and search one or more databases that include information about the wireless coverage area within the geographic area. For example, such databases may include the performance parameters determined in the method of FIG. 3. As another example, these databases may include any other suitable information determined in the method of FIG. 3. In a further embodiment, in order to identify the potential deployment customers based on potential deployment locations, the computer may access and search one or more databases that include address information. For example, such databases may include a list (including addresses) of existing customers. As another example, such databases may include a list of addresses of people and entities that are not current customers (e.g., non-customers) of the wireless service provider, such as databases that include information from the U.S. Census Bureau. In such an example, the computer may compare these addresses with the potential deployment locations in order to identify these non-customers as potential deployment customers.

Once the potential deployment customers have been identified, the method moves to step 418. At step 418, the computer determines initial configuration parameters for deployment of the fBSs. In one embodiment, initial configuration parameters may comprise the operating modes of the fBSs, such as OSG, CSG, HSG, etc. Other parameters may include one or more constraints on the wireless signal used by the fBS (e.g., transmission power, available spectrum and/or channels etc.) based on the fBS being deployed to the identified potential deployment customer. According to one embodiment, the computer may determine these initial configuration parameters based on the possible deployment locations of the fBSs. For example, if a fBS is to be deployed near other wireless service users (such as wireless users other than the customer subscribing to the femtocell service), the computer may determine that the fBS should be operated in CSG to prevent the other wireless service users from receiving their wireless service through the fBS. As a further example, if the fBS is to be deployed at a business location (such as a coffee shop where all customers receive free wireless access), the computer may determine that the fBS be operated in OSG. As such, the business's customers may easily access the wireless service provided by the fBS.

In a further embodiment, the initial configuration parameters may comprise whether or not the fBSs may be deployed at all. For example, if the fBS is be deployed too close to another base station (such as an MBS), the fBS may interfere with the wireless service provided by the base station, or vice versa. As such, the computer may determine that the fBS may not be deployed in such a location.

In one embodiment, upon a determination that the fBS may not be deployed, the method may end. In a further embodiment, upon a determination that the fBS may not be deployed, the computer may determine an alternate location (such as an alternate location at the same address) for the fBS to be deployed, or the computer may determine another suitable solution (such as identifying a nearby fBS that may be configured to OSG or deploying a base station).

At step 422 the computer generates promotional offers. In one embodiment, the promotional offers may be specific to the potential deployment customers. For example, if a potential deployment customer is a high data user, the promotional offer may include a specific price discount to encourage the potential deployment customer to sign up for the femtocell service. The amount of the price discount may be based in part on the amount of data used by the potential deployment customer. In one embodiment, the computer may generate the promotional offers in any suitable manner. For the example, the computer may use any suitable algorithm for generating the promotional offers. As another example, the computer may generate the promotional offers based on input from a user of the computer, or based on one or more online sources.

In one embodiment, the generation of promotional offers may further include the computer determining pricing strategies to use in the promotional offers. In particular embodiments, the computer may determine pricing strategies based on the situation of each potential deployment customer. For example, if the computer identified the potential deployment customer based on the potential deployment customer's high usage of data, the computer may determine a pricing strategy that takes into account the high usage of data. In such an example, the potential deployment customer may receive a discount on the wireless data that is transmitted through the fBS, as opposed to an existing base station, such as a MBS. As a further example, the computer may determine the pricing strategies based on the operation mode of the fBSs. For example, the pricing of a fBS operating in CSG may be more expensive than a fBS operating in HSG or OSG.

In one embodiment, the generation of the promotional offers may further include the computer prioritizing the potential deployment customers before generating the promotional offers. For example, in one embodiment, the potential deployment customers may be prioritized based on how much their subscription to the femtocell service may benefit the wireless service provider. In such an example, if a potential deployment customer's subscription to the femtocell service may redirect a large portion of data through the fBS, as opposed to an existing base station, the wireless service provider may receive a greater benefit from the reduction in strain on the wireless service provided by the existing base stations. In this example, the potential deployment customer may receive a higher priority than another potential deployment customer whose subscription to the femtocell service is not as beneficial to the wireless service provider. In one embodiment, by prioritizing the potential deployment customers, the higher priority potential deployment customers may be the first to receive promotional offers for femtocell service. In one embodiment, the prioritization of the potential deployment customers may further include the computer determining and comparing the benefits that the wireless service provider may receive from the subscription of potential deployment customers to the femtocell service.

In one embodiment, the generation of the promotional offers may further include contacting the potential deployment customers to present the promotional offers. In one embodiment, the potential deployment customers may be contacted by the computer in any suitable way. For example, the computer may generate an electronic mail message to send to the potential deployment customer. As another example, the computer may generate a voicemail message to deliver to the potential deployment customer. In a further embodiment, the potential deployment customers may not be directly contacted by the computer. For example, the computer may generate a notification regarding the promotional offer, and may further provide the notification to a wireless service provider employee. In such an example, after the wireless service provider employee receives the notification, the wireless service provider employee may contact the potential deployment customer. As another example, the promotional offer may be communicated to the potential deployment customer via an advertisement mailed to the potential deployment customer's address.

While the embodiment depicted in FIG. 4 includes a certain number of steps, depicted in a certain order, it is to be understood that other embodiments may have more, fewer or different steps, and the steps may be rearranged.

Figure 5:
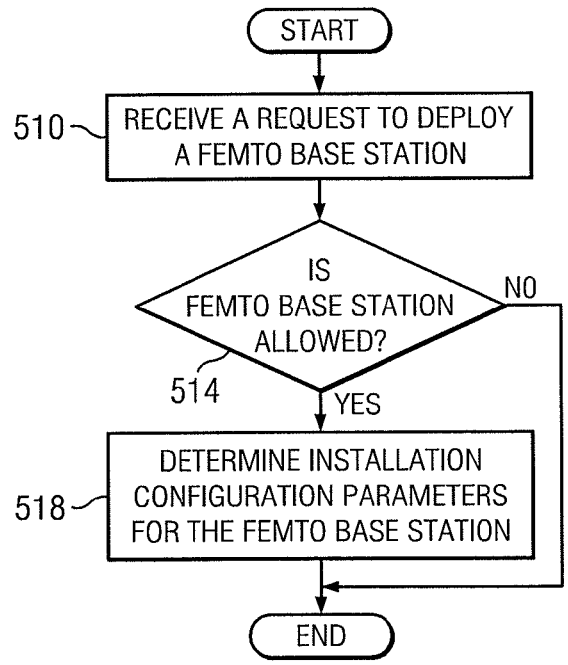
FIG. 5 illustrates a method for determining installation configuration parameters for a femto base station, in accordance with a particular embodiment.

FIG. 5 illustrates a method for determining installation configuration parameters for a fBS, in accordance with a particular embodiment. In one embodiment, this method may reduce the amount of time that may be needed to successfully deploy a fBS. For example, deployment of a fBS has typically required up to a full day of time. In one embodiment, this method may allow the installation configuration parameters to be determined more quickly (and/or prior to the deployment of the fBS). Thus, the time required to successfully deploy the fBS (by either a wireless service provider's technician, or even by the actual customer) may be reduced.

In one embodiment, the method of FIG. 5 may be performed by a computer, such as computer 210 of FIG. 2. As such, the method of FIG. 5 may performed by a radio system level simulator or a commercial radio planning tool.

The method begins at step 510 where the computer receives a request to deploy a fBS. The request may be any suitable type of request to deploy the fBS. For example, the request may be in the form of a visit by the potential deployment customer to the wireless service provider's store or retail center, a phone call, an electronic mail message, a subscription request through the mail, an online subscription request, or any other suitable type of request. The request may further be a request regarding any suitable issue associated with the deployment of a fBS. For example, the request may be regarding a potential deployment customer having trouble installing a fBS, a potential deployment customer wanting to subscribe to femtocell service, a potential deployment customer requesting information about femtocell service, or any other suitable request associated with deploying the fBS. In one embodiment, the computer may receive this request in any suitable manner. For example, the request may be received, directly or indirectly, by the computer through an online submission by the potential deployment customer. As another example, a wireless service provider employee may input the request into the computer after receiving the request from the potential deployment customer, such as during a phone call with the potential deployment customer.

At step 514, the computer determines whether the fBS may be deployed. The computer may make this determination based on any suitable information. For example, the request to deploy the fBS may include address information for the potential deployment customer. As such, based on this address information, the computer may determine that the fBS is not allowed at this address, or at a specific location associated with the address. In particular, the fBS may not be allowed to be deployed if the fBS is to be deployed too close to another base station (such as a MBS), thereby causing interference. As another example, the request to deploy the femto base station may include information about the internet service and/or wireless connections available to, or subscribed to, by the potential deployment customer. As such, the computer may determine that the potential deployment customer may not receive Internet access (or sufficient Internet access) for the fBS to operate. As a further example, the computer may make the determination about whether the fBS is allowed based on one or more simulations, such as the simulations discussed below with regard to step 518.

In one embodiment, upon a determination that the fBS may not be allowed, the method may end. In a further embodiment, upon a determination that the fBS may not be allowed, the computer may determine an alternate location (such as an alternate location at the same address) for the fBS to be deployed, or the computer may determine another suitable solution (such as identifying a close-by fBS that may be configured to OSG).

On the other hand, upon a determination that the fBS is allowed (or if the computer does not yet have enough information in order to make a proper determination) the method moves to step 518. At step 518 the computer determines installation configuration parameters for the fBS. The installation configuration parameters may comprise any suitable configuration parameters for successful deployment of the fBS at a particular location. For example, installation configuration parameters may comprise an operational mode (CSG, OSG, HSG, etc.) for the fBS. Furthermore, the installation configuration parameters may comprise wireless parameters based on characteristics of the wireless coverage area, such as any suitable physical layer (PHY) and/or media access control layer (MAC) configuration parameters. Additionally, the installation configuration parameters may comprise parameters for the air interface or backhaul connection of the fBS.

The computer may determine the installation configuration matters using any suitable method. In one embodiment, the computer may determine the installation configuration parameters based on an onsite visit to the location where fBSs may be deployed, such as a potential deployment customer's house, office, or business enterprise (which may require more than one fBS in order to provide satisfactory wireless service). During the on site visit, a wireless service provider's technician may create a video recording of the location, such as the indoor environment and layout of the location. Furthermore, the wireless service provider's technician may also take detailed measurements of the location. The computer may then create a three-dimensional layout of the location using the video recording and/or measurements using any suitable computer program, such as computer vision. In a further embodiment, the three-dimensional layout of the location may be created independent of the computer, and then the three-dimensional layout may be input into the computer. Once the computer has the three-dimensional layout of the location, the computer may run one or more simulations of the deployment of the fBSs. These simulations may include, in one embodiment, simulations of the propagation of wireless signals to and from the fBSs in the three-dimensional layout. In one embodiment, the computer may then combine the simulations (and the data collected from the simulations) with the detailed measurements taken by a wireless service provider's technician during the onsite visit. Based on this combination, in one embodiment, the computer may determine the installation configuration parameters and placement of the fBS. Once these installation configuration parameters have been determined by the computer, a wireless service provider's technician may return to the potential deployment customer's location and properly deploy the fBSs at the location using the installation configuration parameters, or the potential deployment customer may use the installation configuration parameters to successfully deploy the fBSs.

In another embodiment, the computer may determine the installation configuration parameters based on empirical modeling. Empirical modeling may comprise modeling performed using a spatial channel model (SCM) or any other suitable empirical modeling method.

In one embodiment, in order to determine the initial configuration parameters using empirical modeling, the computer may create various templates to use in a simulation of the deployment of the fBSs. These templates may be created for various types of locations and types of environments. For example, a template may be created for a large building, a small building, a location with high elevation, a location with low elevation, a location close to an existing base station, and/or any other suitable type of location or environment. In particular embodiments, these templates may represent generic types of locations or environments. In one embodiment, the templates may be created using geographical information, such as three-dimensional measurements of particular locations, and also using detailed modeling methods, such as Ray Tracing and/or Finite-Difference Time-Domain (FDTD). Since these detailed modeling methods are time consuming methods, the templates may be created in advance to the computer needing them for the determination of the initial configuration parameters.

After the templates are created, the templates may be trained using empirical modeling. This empirical modeling may result in the determination of modeling parameters for each of the templates (resulting in the determination of modeling parameters for each of the different location types and different environment types that the templates represent). In one embodiment, the training of the templates may comprise empirically modeling a template multiple times. In such an embodiment, the modeling parameters resulting from each session of empirical modeling may be averaged in order to determine more realistic modeling parameters for the templates.

Once the templates have been created and trained, the templates may be stored, such as in databases accessible to the computer. In one embodiment, the storing of the templates may include classifying the templates based on geographical information (such as three-dimensional location information, terrain, land cover, etc.). This type of classification may allow the templates to be classified based on different location types and different environment types.

In one embodiment, in order to determine the initial configuration parameters using empirical modeling, the computer may select one or more of the templates to use in a simulation of the deployment of the fBSs. In one embodiment, a template may be selected using geographic information (such as three-dimensional location information, terrain, land cover, etc.) and/or geometric information (such as building structure, floor plan, etc.) associated with the location where the femto bases stations are to be deployed. This information may be determined in any suitable way. For example, the computer may determine this information based on the address of the location where the fBSs are to be deployed. In particular embodiments, this may include extracting three-dimensional information from online map resources such as Google map or Bing map. In one embodiment, the geographic and/or geometric information may only be geographic and/or geometric information associated with the outdoor layout of the location, not the indoor layout. In one embodiment, it may be associated with only the indoor layout or both the indoor and outdoor layout.

Using the geographic information and/or geometric information associated with the location where the fBS is to be deployed, the computer may select a template to use as a model of the location. In particular embodiments, such a selection may include determining which template has geographic and/or geometric information most similar to that of the location where the fBS is to be deployed. This determination may be made by searching the classifications in the database where the templates are stored.

After the appropriate template has been selected, the computer may then simulate the deployment of the fBS based on the template and the modeling parameters of the template. In one embodiment, the computer may determine the installation configuration parameters based on this simulation. For example, the computer may simulate the deployment of the fBSs using various operational modes (CSG, OSG, HSG, etc.) for the femto bases station, various wireless parameters (such as any suitable PHY and/or MAC parameters), and/or various air interface or backhaul connection parameters. In one embodiment, the simulation may include further empirical modeling.

In one embodiment, determining the installation configuration parameters based on empirical modeling and the templates may result in more accurate installation configuration parameters than would typically result from empirical modeling by itself. For example, empirical modeling is not as detailed as Ray Tracing and FDTD modeling techniques. However, empirical modeling is faster than these more detailed modeling techniques. Therefore, by combining empirical modeling with templates (which were created using the detailed modeling of generic location and environment types) an accurate set of installation configuration parameters may be determined in a short amount of time.

As is explained above, FIG. 5 illustrates steps 514 and 518 occurring after the computer has received the request to deploy the fBS. Such an embodiment of FIG. 5 may be referred to as "Online-Operation." According to one embodiment of Online-Operation, one or more of the steps of FIG. 5 may occur while the potential deployment customer is waiting for the results of the method. For example, after having trouble deploying the fBS, the potential deployment customer may call a customer service representative. The customer service representative may then direct the computer to perform one or more of steps 514-518 while the potential deployment customer is still on the phone with the customer service representative. Once the steps are complete, the customer service representative may use the determinations of steps 514-518 to explain to the potential deployment customer how to successfully deploy the fBS.

In another embodiment of Online-Operation, one or more of the steps of FIG. 5 may occur after the computer has received the request to deploy the fBS. For example, a potential deployment customer may submit a request for femtocell service. Based on this request, one or more of steps 514-518 may be performed. The results of one or more of the steps of FIG. 5 may then be communicated to the potential deployment customer at a later time. Such a communication may be in the form of an electronic mail message, a return phone call, or any other suitable form of communication. The results of one or more of the steps of FIG. 5 may be used to configure the fBS before it is shipped, or otherwise delivered, to the potential deployment customer.

In a further embodiment, steps 514-518 of FIG. 5 may be performed by the computer before the computer receives the request to deploy the fBS. Such an embodiment of FIG. 5 may be referred to as "Offline-Operation." According to one embodiment of Offline-Operation, one or more of steps 514-518 of FIG. 5 may occur before the potential deployment customer has provided a request to deploy the fBS. For example, the computer may assume that a potential deployment customer is going to eventually subscribe to the femtocell service. Based on this assumption, the computer may perform one or more of steps 514-518 of FIG. 5 so that the results of those steps may already be known by the time the potential deployment customer actually provides the request to deploy the fBS.

In one embodiment of the Offline-Operation, the computer may use various databases to determine potential deployment customers to perform the steps of FIG. 5 for. Such databases may include existing customer databases, previous customer databases, non-customer databases, or any other suitable database that may include information regarding potential deployment customers. In one embodiment, the computer may identify the potential deployment customers using any suitable method. For example, the computer may use potential deployment customers identified or determined in FIG. 3 and/or FIG. 4. As another example, the computer may identify potential deployment customers by randomly selecting them from any suitable database.

In one embodiment, after the computer identifies potential deployment customers, the computer may use any suitable information associated with the potential deployment customers (such as the potential deployment customer's address) to determine whether the fBS would be allowed at a location associated with the potential deployment customer, and also to determine installation configuration parameters for the fBS (in accordance with steps 514-518). Once these determinations have been made by the computer, they may be stored (such as at the computer or at databases accessible by the computer). Therefore, when the computer does receive the request for deployment of the fBS, as is discussed in step 510, the computer may retrieve the stored determinations, and provide those determinations so that the deployment of the fBS may be conducted more rapidly.

In a further embodiment, the method of FIG. 5 may further include the computer determining a pricing strategy for the fBSs. For example, based on the installation configuration parameters, the computer may determine a more accurate pricing strategy for the potential deployment customer. As such, when the potential deployment customer requests deployment of the fBS, a more accurate price may be provided to the potential deployment customer.

While the embodiment depicted in FIG. 5 includes a certain number of steps, depicted in a certain order, it is to be understood that other embodiments may have more, fewer or different steps, and the steps may be rearranged.

In one embodiment, each of the methods illustrated in FIGS. 3-5 may be individual, standalone methods. In a further embodiment, each of the methods of FIGS. 3-5 may be performed in combination with each other. As an example, one or more steps of one of the methods illustrated in FIGS. 3-5 may be performed together with one or more of the steps of any of the other methods of FIGS. 3-5. In particular, the steps of the method of FIG. 3 may be performed prior to steps of the methods of FIGS. 4-5. Once the steps of FIG. 3 have been performed, the computer may perform steps of the method illustrated in FIG. 4. Furthermore, after the steps of the method of FIG. 4 have been performed by the computer, the computer may then perform steps of the method of FIG. 5. In a further embodiment, after the computer performs steps of the method of FIG. 3, the computer may move directly to the steps in the method of FIG. 5, thus bypassing the method of FIG. 4. In another embodiment, after one or more steps in a method of FIGS. 3-5 have been performed, the computer may return to any of the other methods of FIGS. 3-5. For example, after the computer performs steps in the method of FIG. 5, the computer may return to one or more steps in the method of FIG. 4, so as to further promote the femtocell services.

Numerous other changes, substitutions, variations, alterations and modifications may be ascertained by those skilled in the art and it is intended that the present disclosure encompass all such changes, substitutions, variations, alterations and modifications as falling within the spirit and scope of the appended claims.

What is claimed:

1. A method comprising:
receiving information indicative of a wireless coverage area associated with each of a plurality of base stations within a geographic area;
determining a threshold performance requirement within the geographic area;
simulating a deployment of at least one femto base station within the geographic area;
determining at least a first performance parameter based on the simulated deployment of the at least one femto base station within the geographic area;
simulating a deployment of at least one additional base station within the geographic area, the at least one additional base station not being a femto base station;
determining at least a second performance parameter based on the simulated deployment of the at least one additional base station within the geographic area;
comparing at least the first and second performance parameters; and
generating a deployment recommendation based on at least the comparison of the first and second performance parameters and the threshold performance requirement, the deployment recommendation indicating whether to deploy the at least one femto base station within the geographic area.

2. The method of claim 1, wherein generating a deployment recommendation comprises comparing the first performance parameter with the threshold performance requirement, the deployment recommendation indicating:
to deploy the at least one femto base station if the first performance parameter is greater than the threshold performance requirement; and
to not deploy the at least one femto base station if the first performance parameter is less than the threshold performance requirement.

3. The method of claim 1:
further comprising:
determining at least a first cost parameter based on the simulated deployment of the at least one femto base station within the geographic area;
determining at least a second cost parameter based on the simulated deployment of the at least one additional base station within the geographic area; and
comparing at least the first and second cost parameters;
wherein generating the deployment recommendation is further based on the comparison of the first and second cost parameters.

4. The method of claim 1, wherein determining a threshold performance requirement within the geographic area comprises:
receiving demographic information associated with the geographic area; and
determining the threshold performance requirement based at least on the demographic information associated with the geographic area.

5. The method of claim 1, further comprising determining whether to share one or more wireless channels between the at least one femto base station and the one or more base stations deployed within the geographic area.

6. The method of claim 1, further comprising generating at least one pricing strategy associated with deploying the at least one femto base station within the geographic area.

7. An apparatus comprising:
an interface configured to receive information indicative of a wireless coverage area associated with each of a plurality of base stations within a geographic area; and
a processor coupled to the interface and configured to:
determine a threshold performance requirement within the geographic area;
simulate a deployment of at least one femto base station within the geographic area;
determine at least a first performance parameter based on the simulated deployment of the at least one femto base station within the geographic area;
simulate a deployment of at least one additional base station within the geographic area, the at least one additional base station not being a femto base station;
determine at least a second performance parameter based on the simulated deployment of the at least one additional base station within the geographic area;
compare at least the first and second performance parameters; and
generate a deployment recommendation based on at least the comparison of the first and second performance parameters and the threshold performance requirement, the deployment recommendation indicating whether to deploy the at least one femto base station within the geographic area.

8. The apparatus of claim 7, wherein the processor configured to generate a deployment recommendation is further configured to compare the first performance parameter with the threshold performance requirement, the deployment recommendation indicating:
to deploy the at least one femto base station if the first performance parameter is greater than the threshold performance requirement; and
to not deploy the at least one femto base station if the first performance parameter is less than the threshold performance requirement.

9. The apparatus of claim 7, wherein the processor is further configured to:
determine at least a first cost parameter based on the simulated deployment of the at least one femto base station within the geographic area;
determine at least a second cost parameter based on the simulated deployment of the at least one additional base station within the geographic area; and
compare at least the first and second cost parameters;
wherein the processor configured to generate the deployment recommendation is further configured to generate the deployment recommendation based on the comparison of the first and second cost parameters.

10. The apparatus of claim 7, wherein the processor configured to determine a threshold performance requirement within the geographic area is further configured to:
receive demographic information associated with the geographic area; and
determine the threshold performance requirement based at least on the demographic information associated with the geographic area.

11. The apparatus of claim 7, wherein the processor is further configured to determine whether to share one or more wireless channels between the at least one femto base station and the one or more base stations deployed within the geographic area.

12. The apparatus of claim 7, wherein the processor is further configured to generate at least one pricing strategy associated with deploying the at least one femto base station within the geographic area.

13. One or more computer-readable non-transitory storage media embodying software that when executed by a processor is configured to:
receive information indicative of a wireless coverage area associated with each of a plurality of base stations within a geographic area;
determine a threshold performance requirement within the geographic area;
simulate a deployment of at least one femto base station within the geographic area;
determine at least a first performance parameter based on the simulated deployment of the at least one femto base station within the geographic area;
simulate a deployment of at least one additional base station within the geographic area, the at least one additional base station not being a femto base station;
determine at least a second performance parameter based on the simulated deployment of the at least one additional base station within the geographic area;
compare at least the first and second performance parameters; and
generate a deployment recommendation based on at least the comparison of the first and second performance parameters and the threshold performance requirement, the deployment recommendation indicating whether to deploy the at least one femto base station within the geographic area.

14. The media of claim 13, wherein the software, that when executed, is configured to generate a deployment recommendation is further configured, when executed, to compare the first performance parameter with the threshold performance requirement, the deployment recommendation indicating:
to deploy the at least one femto base station if the first performance parameter is greater than the threshold performance requirement; and
to not deploy the at least one femto base station if the first performance parameter is less than the threshold performance requirement.

15. The media of claim 13, wherein the software, when executed, is further configured to:
determine at least a first cost parameter based on the simulated deployment of the at least one femto base station within the geographic area;
determine at least a second cost parameter based on the simulated deployment of the at least one additional base station within the geographic area; and
compare at least the first and second cost parameters;
wherein the software, that when executed, is configured to generate the deployment recommendation is further configured, when executed, to generate the deployment recommendation based on the comparison of the first and second cost parameters.

16. The media of claim 13, wherein the software, that when executed, is configured to determine a threshold performance requirement within the geographic area is further configured to:
- receive demographic information associated with the geographic area; and
- determine the threshold performance requirement based at least on the demographic information associated with the geographic area.

17. The media of claim 13, wherein the software, when executed, is further configured to determine whether to share one or more wireless channels between the at least one femto base station and the one or more base stations deployed within the geographic area.

18. The media of claim 13, wherein the software, when executed, is further configured to generate at least one pricing strategy associated with deploying the at least one femto base station within the geographic area.

* * * * *